Dec. 13, 1960  K. F. SONNTAG  2,964,277
CURTAIN ROD SUPPORT
Filed March 19, 1959

INVENTOR
Karl F. Sonntag
BY
*H. F. Johnston*
ATTORNEY 2,964,277
Patented Dec. 13, 1960

2,964,277
CURTAIN ROD SUPPORT

Karl F. Sonntag, Watertown, Conn., assignor to Scovill Manufacturing Company, Waterbury, Conn., a corporation of Connecticut Filed Mar. 19, 1959, Ser. No. 800,423

1 Claim. (Cl. 248—205)

This invention relates to a curtain rod support and adapted to be attached to a window frame and adjustable with respect to the distance of the rod supporting hook from the window.

One of the objects of this invention is to provide a curtain rod support of a universal character so that the same support can be attached to either end or the middle of a window frame or the like.

A further object is to provide a support of the above nature which may be easily adjusted to support the rod at precisely the desired distance from a window frame.

Other objects and advantages of my invention will be apparent from the following description of the device, one embodiment of which is shown in the accompanying drawing, wherein.

Figure 1:
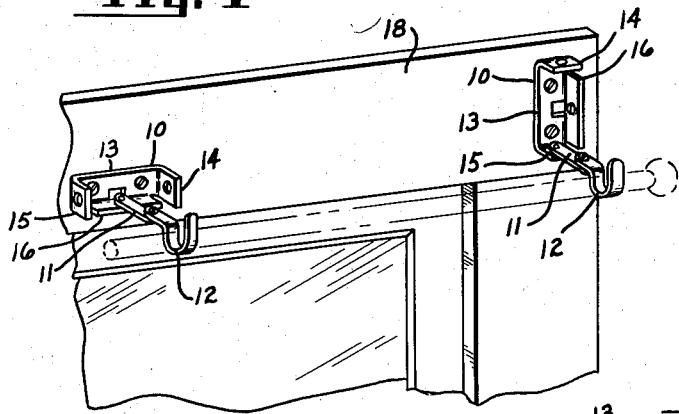
Fig. 1 is a perspective view showing two positions of the curtain rod support embodying my invention as they appear attached to window frame.
Figure 2:
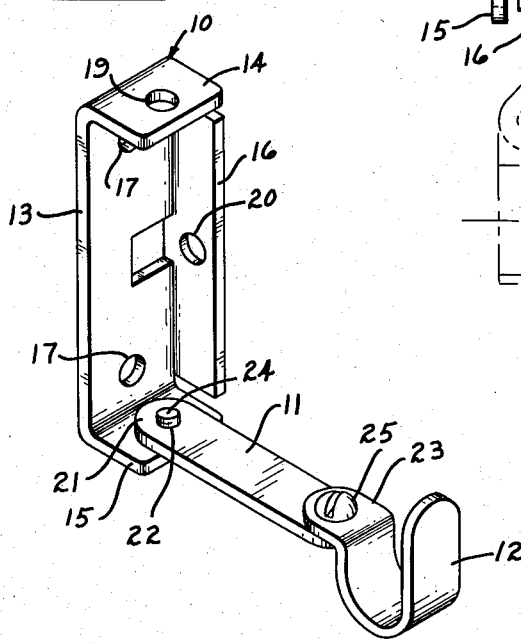
Fig. 2 is a perspective view of the support and showing one supporting position of the adjustable arm; and, Fig. 3 is a plan view of the support showing a different supporting position of the adjustable arm.

Referring now to the drawing, the curtain rod support is made up essentially of three pieces: a bracket 10, a horizontal adjusting arm 11 and a rod supporting hook 12.

The bracket 10 consists of a rectangular flat base 13 having forwardly extending flanges 14 and 15 at its opposite ends and a longer flange 16 projecting forwardly from one of the longitudinal edges of said plate. The base 13 has a pair of apertures 17 through which nails or screws may be driven for attaching the bracket 10 to any support such as a window frame 18. Each of the flanges 14 and 15 has a central aperture 19 and likewise an aperture 20 is provided in the mid-portion of the flange 16, the above flanges serving as shelves to which the adjusting arm 11 may be selectively attached as will be explained later.

The adjusting arm 11 is made from a strip of flat stock formed with rounded ends 21 and provided with a tapped hole 22 adjacent each end. In case the bracket 10 is to be attached to the right side of the window frame 18, one end of the arm 11 may be hingedly attached to the upper surface of the lower end flange 15 by means of a screw 24 inserted through the hole 19 in said flange from the underside thereof and threaded into one of the tapped holes 22.

The support hook 12 is provided with an offset lug 23 which is adapted to overlie the opposite end of the arm 11 and hingedly secured thereto as by a screw passing through a suitable aperture in the hook lug 23 and threaded into the tapped hole 22 at the outer end of said arm.

In case it is desired to secure the rod support to the center of the window frame 18, the arm 11, if it happens to be attached to one of the end flanges 14 or 15, may be removed therefrom and attached to the longer side flange 16 by the same screw 24 inserted through the flange opening 20 and threaded into the tapped hole 22 in said arm.

By reason of screw connections at the ends of the adjusting arm 11 for joining the same to the bracket 10 and hook 12, said arm can be adjusted to various rotative positions to vary the distances that the hook 12 may be spaced from the frame 10 at any adjustable position and also said hook can be rotated relative to the arm so that the axis of said hook can be arranged to coincide with the axis of the rod which it is to support, said rod being shown in dotted line in Fig. 1.

Figure 3:
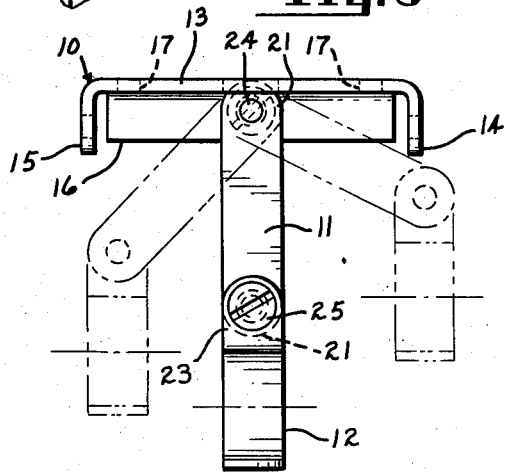

In Fig. 3, the arm 11 and the hook 12 as shown in full is the maximum distance that the hook can be supported from the frame 18, and in dotted outline two other positions of the arms are shown for supporting hook at different distances from said frame.

One form of the invention is herein shown and described, but changes in details of construction may be made without departing from the scope of what is claimed.

What is claimed:

A universal curtain rod support comprising a bracket having a rectangular flat base adapted to abut and to be attached to a vertical surface of a window frame, said bracket having a flange projecting from one of the longer edges of said base and also flanges projecting in the same direction as the longer flange from the ends of said base whereby said longer flange or either one of the end flanges will provide a horizontal shelf depending upon the arrangement of the bracket with respect to the window frame, a horizontal projecting adjusting arm, means selectively and hingedly connecting one end of said arm to one of the flanges and a rod-supporting hook hingedly connected to the opposite end of said arm whereby said arm may be swung to different angular positions relative to said base to adjust the distance from the window frame of the support hook while the hook may be adjusted to maintain its rod-supporting axis in parallel relationship to said base.

References Cited in the file of this patent

UNITED STATES PATENTS

| | | |
|---|---|---|
| 1,245,744 | Leibner | Nov. 6, 1917 |
| 2,894,710 | Shields | July 14, 1959 |